(12) United States Patent
Takatsugi et al.

(10) Patent No.: US 7,665,978 B2
(45) Date of Patent: Feb. 23, 2010

(54) INJECTION MOLDING MACHINE HAVING A CENTERING DEVICE FOR CENTERING A NOZZLE HOLE

(75) Inventors: Satoshi Takatsugi, Yamanashi (JP);
Wataru Shiraishi, Yamanashi (JP);
Toshio Ishikuro, Yamanashi (JP);
Hiroyasu Asaoka, Yamanashi (JP);
Hiroshi Imamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1002 days.

(21) Appl. No.: 11/033,728

(22) Filed: Jan. 13, 2005

(65) Prior Publication Data

US 2005/0161848 A1 Jul. 28, 2005

(30) Foreign Application Priority Data

Jan. 22, 2004 (JP) ............................. 2004-014042

(51) Int. Cl.
*B29C 45/80* (2006.01)
(52) U.S. Cl. .................................................. 425/150
(58) Field of Classification Search .................. 425/150
See application file for complete search history.

(56) References Cited

U.S. PATENT DOCUMENTS

| 5,035,599 A | * | 7/1991 | Harashima et al. ........... 425/150 |
| 5,154,084 A | | 10/1992 | Sonderegger et al. |

FOREIGN PATENT DOCUMENTS

| DE | 43 01 935 | 10/1993 |
| JP | 41-5262 | 3/1966 |
| JP | 41-17593 | 8/1966 |
| JP | 63-81020 | 4/1988 |
| JP | 63072016 U | 5/1988 |
| JP | 63-202419 | 8/1988 |
| JP | 2-301416 | 12/1990 |
| JP | 3153015 | 7/1991 |
| JP | 09-011277 | 1/1997 |
| JP | 10-230352 | 9/1998 |
| JP | 11170301 | 6/1999 |
| JP | 11-342523 | 12/1999 |
| JP | 2000167668 | 6/2000 |
| JP | 2001-225373 | 8/2001 |

OTHER PUBLICATIONS

Notice of Reasons for Rejection (Office Action) in corresponding Japan Application No. 2004-014042 dated Aug. 23, 2006.

(Continued)

*Primary Examiner*—Tim Heitbrink
(74) *Attorney, Agent, or Firm*—Staas & Halsey LLP (57) ABSTRACT

A mold is mounted with a locating ring mated into a hole in a stationary platen. A distance measuring unit is disposed to the side of the injection nozzle. The distance A between the sprue hole and the outer circumference of the locating ring and the distance B between the distance measuring unit and the outer circumference of the locating ring are both known. The distance C between the central axis of the nozzle hole and the side of the injection nozzle is also known. If the distance D to the side of the injection nozzle is measured by means of the distance measuring unit, the displacement between the central axis of the sprue hole and the central axis of the nozzle hole is obtained by calculating $\{(A+B)-(C+D)\}$. The injection nozzle is centered by being moved manually or automatically by the amount corresponding to the displacement.

9 Claims, 3 Drawing Sheets

OTHER PUBLICATIONS

EP Search Report for corresponding EP Application No. 05250219.2-23-7 dated Jun. 15, 2005.

EP Search Report for corresponding application EP 05250219.2-2307 dated Sep. 21, 2005.

\* cited by examiner

FIG. 7

INJECTION MOLDING MACHINE HAVING A CENTERING DEVICE FOR CENTERING A NOZZLE HOLE

BACKGROUND OF THE INVENTION

1. Field of the Invention

The present invention relates to an injection molding machine and, more particularly, to the centering of a nozzle hole formed in an injection nozzle to a sprue hole formed in a mold.

2. Description of the Related Art

An injection molding machine seats the injection nozzle of an injection unit against the sprue bushing of a mold mounted on a stationary platen and injects melted resin from a nozzle hole in the injection nozzle into the mold through a sprue hole provided in the sprue bushing. The central axis of the sprue hole must accordingly be aligned with the central axis of the nozzle hole in the injection nozzle; this involves a process of centering the nozzle hole in the injection nozzle to the sprue hole in the mold and adjusting the centering.

In conventional nozzle hole centering, it is known art to mount a ring-shaped member at the end of the injection nozzle and insert the ring-shaped member into the injection nozzle insertion opening in the mold by moving the injection unit while visually monitoring interference between the ring-shaped member and the injection nozzle insertion opening, thereby centering the nozzle hole, or to detect the injection nozzle insertion opening in the mold with an optical sensor attached at the end of the injection nozzle, thereby centering the nozzle hole (see Japanese Patent Application Laid-Open No. 09-11277).

It is also known art to configure an injection nozzle alignment jig by providing a mirror section at the center of the stationary platen on the side facing the injection unit, opposite to the side on which the mold is mounted; a light source emitting a laser beam toward the injection nozzle is disposed in a hole formed at the center of the mirror section; the reflection of the injection nozzle in the mirror section is monitored and the injection apparatus is moved horizontally and vertically by operating adjustment bolts so that the laser beam passes through the hole in the injection nozzle, thereby centering the nozzle hole (see Japanese Patent Application Laid-Open No. 11-342523).

It is also known art to image the injection nozzle and the inlet bushing on the mold with a camera, measure the displacement between the central axis position of the imaged injection nozzle and the position of the imaged inlet bushing, and make centering adjustments accordingly (Japanese Patent Application Laid-Open No. 2001-225373).

In conventional injection nozzle centering methods, alignment with the sprue hole is generally carried out while the injection nozzle position or the position of another part is observed visually. In the method disclosed in the above Japanese Patent Application Laid-Open No. 09-11277, for example, the injection nozzle position is visually observed. The task of bringing the nozzle hole and the sprue hole into contact with each other and checking the amount of displacement has to be repeated through a trial-and-error process. In addition, when observing the injection nozzle directly, the operator has to bring his or her face close to the injection nozzle and injection cylinder, which are at high temperatures. In the invention described in the above Japanese Patent Application Laid-Open No. 11-342523, in which the centering adjustment is made while the reflection of the injection nozzle in the mirror is being visually monitored, the operator also has to bring his or her face close to the injection nozzle and injection cylinder, which are at high temperatures. Another problem raised by visual adjustment is that the displacement and the direction of adjustment are not quantitative and thus a trial-and-error process has to be repeated.

The method described in the above Japanese Patent Application Laid-Open No. 2001/225373, in which a camera is used, requires that the jig and camera be placed in the central axis direction of the nozzle hole. Space to accommodate the jig and camera is then required between the injection nozzle and sprue. After the central axis of the nozzle hole and the central axis of the sprue hole have been aligned, therefore, the injection section has to be moved over a considerable distance to actually bring the injection nozzle and the mold into mutual contact; if the injection section cannot be moved straight forward with high accuracy, a displacement may be produced between the central axis of the nozzle hole and the central axis of the sprue hole when the injection nozzle comes into contact with the mold. Extra work is also required to mount and then detach the jig so that the injection nozzle can be brought into contact with the mold. Obtaining enough space between the injection nozzle and the sprue is also problematic: to form the space, the injection section must be capable of moving over a sufficiently long distance in the central axis direction of the nozzle hole, making the machine large.

SUMMARY OF THE INVENTION

An injection molding machine according to the present invention has centering means for centering of a nozzle hole formed in an injection nozzle to a sprue hole.

The centering means in a first embodiment has a distance measuring unit that measures a distance to a first reference point at a known distance from the central axis of the nozzle hole, and also includes means for obtaining the displacement between the central axis of the nozzle hole and the known central axis of the sprue hole from the distance measured by the distance measuring unit, and means for adjusting the position of the injection nozzle according to the obtained displacement. The first reference point may be set on the outer circumference of the injection nozzle, on the outer circumference of a component of the injection section that engages the injection nozzle, or on a jig attached to the injection section.

The centering means in a second embodiment has a distance measuring unit that measures a first distance to a first reference point at a known distance from the central axis of the nozzle hole and a second distance to a second reference point at a known distance from the central axis of the sprue hole, and also includes means for obtaining the displacement between the central axis of the nozzle hole and the central axis of the sprue hole from the first distance and second distance measured by the distance measuring unit, and means for adjusting the position of the injection nozzle according to the obtained displacement. The first reference point may be set on the outer circumference of the injection nozzle, on the outer circumference of a component of the injection section that engages the injection nozzle, or on a jig attached to the injection section. The second reference point may be set on the mold, on a part accompanying the mold, on a jig attached to the mold, on a platen of the injection molding machine that secures the mold, or on a jig attached to the platen.

The injection molding machine having the centering means in the first embodiment or the second embodiment can take the following forms.

A plurality of distance measuring units are provided, and the displacement between the central axis of the nozzle hole and the central axis of the sprue hole is obtained in a plurality of directions according to distances measured by the plurality of distance measuring units.

Alternatively, a single distance measuring unit is provided, and the displacement between the central axis of the nozzle hole and the central axis of the sprue hole is obtained in a plurality of directions by moving the distance measuring unit to different positions.

The distance measuring unit or units are connected to a computing and display unit, and the amount of displacement is displayed on the display unit.

The centering between the nozzle hole and the sprue hole is carried out by using a manual adjustment means to manually move the injection nozzle by the obtained amount of displacement.

Alternatively, the centering between the nozzle hole and the sprue hole is carried out by using a driving means and adjusting the driving means by the obtained displacement.

A first embodiment of a first centering method for an injection molding machine that centers the nozzle hole in the injection nozzle to the sprue hole in the mold according to the present invention includes the steps of measuring a distance to a reference point on the injection nozzle with a distance measuring unit, obtaining a displacement between the central axis of the nozzle hole and the central axis of the sprue hole according to the measured value obtained by the distance measuring unit, a known distance from the reference point to the central axis of the nozzle hole, and a known distance from the distance measuring unit to the central axis of the sprue hole, and adjusting the position of the injection nozzle according to the obtained displacement.

A second embodiment of a centering method for an injection molding machine that centers the nozzle hole in the injection nozzle to the sprue hole in the mold according to the present invention includes the steps of measuring a first distance to a first reference point on the injection nozzle and a second distance to a second reference point on the mold with a distance measuring unit, obtaining a displacement between the central axis of the nozzle hole and the central axis of the sprue hole according to the measured values obtained by the distance measuring unit, a known distance from the first reference point on the injection nozzle to the central axis of the nozzle hole, and a known distance from the second reference point on the mold to the central axis of the sprue hole, and adjusting the position of the injection nozzle according to the obtained displacement.

The present invention provides an injection molding machine and a centering method that use a simple structure to achieve accurate, easy alignment and centering of a sprue hole and a nozzle hole.

The present invention enables the operator to perform centering adjustment without having to bring his or her face close to the injection nozzle and injection cylinder, which are at high temperatures. Visual observation is not necessary in the centering adjustment. Furthermore, the displacement between the central axis of the nozzle hole and the central axis of the sprue hole is quantitatively indicated, so the centering adjustment can be performed quickly and easily without a trial-and-error process. If the distance measuring unit is disposed beside the injection nozzle, a space for accommodating the distance measuring unit does not need to be left between the injection nozzle and the sprue hole, enabling the injection nozzle to be brought close to the mold during the centering adjustment. Accordingly, the centering adjustment can be made in a state in which the injection nozzle only has a short distance to move until it touches the mold; displacement between the central axis of the nozzle hole and the central axis of the sprue hole due to the effect of the accuracy with which the injection section can be moved straight forward can be therefore eliminated.

BRIEF DESCRIPTION OF THE DRAWINGS

The purposes and advantages of the present invention, including those described above, will be clarified by reference to the attached drawings in combination with the description of the embodiment presented below. Of these drawings.

DESCRIPTION OF THE EMBODIMENTS

Figure 1:
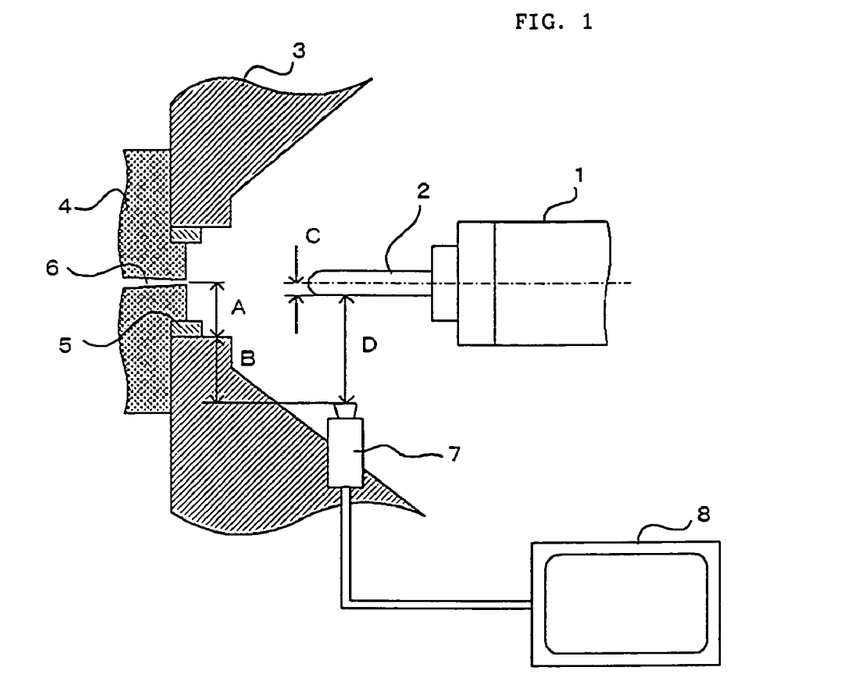
FIG. 1 illustrates how the displacement between the central axis of a nozzle hole and the central axis of a sprue hole is obtained according to the first embodiment of the present invention.

FIG. 1 shows the main elements of an injection molding machine which embodies the present invention, showing a vertical cross-section of the injection section and mold section of the machine viewed from a horizontal direction. In FIG. 1, reference numeral 1 denotes an injection cylinder disposed in the injection unit; an injection nozzle 2 is attached at the end of the injection cylinder. Reference numeral 4 denotes a sprue bushing on a mold (not shown), through which melted resin first passes into the mold. A locating ring 5 that positions the sprue bushing 4 is mounted in a mounting hole in a stationary platen 3. Reference numeral 6 denotes a sprue hole formed in the sprue bushing 4.

A distance measuring unit 7 is disposed at a position where the distance to the side of the injection nozzle 2 can be measured. The distance measuring unit 7 may be a non-contact distance measuring unit that uses, for example, infrared light, or a contact distance measuring unit that uses a device such as a touch sensor. A computing and display unit 8 is connected to the distance measuring unit 7; measured distances and other data are displayed on the screen of the computing and display unit 8. In this embodiment, the computing and display unit 8 is configured as a controller that controls the injection molding machine, and measured distances and other data are displayed on a display unit of the controller.

As shown in FIG. 1, the distance measuring unit 7 is mounted in a position at a distance B (a known value) from the outside surface of the locating ring 5.

Usually, the sprue hole 6 is formed in the sprue bushing 4 so that the central axis of the sprue hole is aligned with the central axis of the locating ring 5, thus with the central axis of the hole in the stationary platen 3 into which the locating ring 5 fits. Exceptionally, the central axis of the sprue hole 6 may deviate from the central axis of the locating ring 5.

When the mold is designed so that the central axis of the sprue hole 6 aligns with the central axis of the locating ring 5, the distance A between the outer surface of the locating ring 5 (the inner surface of the hole formed in the stationary platen 3) and the central axis of the sprue hole 6 is known. As described above, the distance B from the distance measuring unit 7 to the outer surface of the locating ring 5 is also known. Accordingly, the distance from the distance measuring unit 7 to the central axis of the sprue hole 6 can be obtained by adding the two known values (A+B). The value (A+B) is preset in the computing and display unit 8.

The distance C between the central axis of the nozzle hole in the injection nozzle 2 and the outer surface of the injection nozzle 2 is also known from drawings, specifications of the injection nozzle, or other material, so the distance C is preset in the computing and display unit 8. As a result, by measuring the distance D from the distance measuring unit 7 to the outer surface of the injection nozzle 2 by using the distance measuring unit 7, the distance (C+D) from the distance measuring unit 7 to the central axis of the nozzle hole in the injection nozzle 2 can be calculated. Instead of the outer surface of the injection nozzle 2, the side of a component other than of the injection nozzle 2 that moves together with the injection nozzle 2 in an integral manner, such as the side of the injection section of the injection cylinder, for example, can be measured to calculate the distance between the distance measuring unit 7 and the central axis of the nozzle hole in the injection nozzle 2, provided that the distance between the side of the other component and the central axis of the nozzle hole in the injection nozzle 2 is known.

Furthermore, a jig (not shown) may be attached at a known distance from the central axis of the nozzle hole in the injection nozzle 2, and the distance from the distance measuring unit 7 to the jig, instead of to the outer surface of the injection nozzle 2, may be measured to obtain the distance from the distance measuring unit 7 to the central axis of the nozzle hole in the injection nozzle 2.

From the distance (A+B) between the distance measuring unit 7 and the central axis of the sprue hole 6 and the distance (C+D) between the distance measuring unit 7 and the central axis of the nozzle hole in the injection nozzle 2, obtained as described above, the computing and display unit 8 can obtain the displacement between the central axis of the nozzle hole and the central axis of the sprue hole by calculating $\{(A+B)-(C+D)\}$.

In the above example, the outer surface of the injection nozzle 2 is used as the reference point for the distance measurement, the distance from the outer surface to the central axis of the nozzle hole being known. However, the reference point is not limited to the outer surface of the injection nozzle 2; other parts, such as the outer periphery of a component of the injection section into which the injection nozzle 2 fits, or a jig attached to the injection unit, can also be used as the reference point if their distances to the central axis of the nozzle hole in the injection nozzle 2 can be measured easily or the distances have been already measured in advance and are known.

Figure 2:
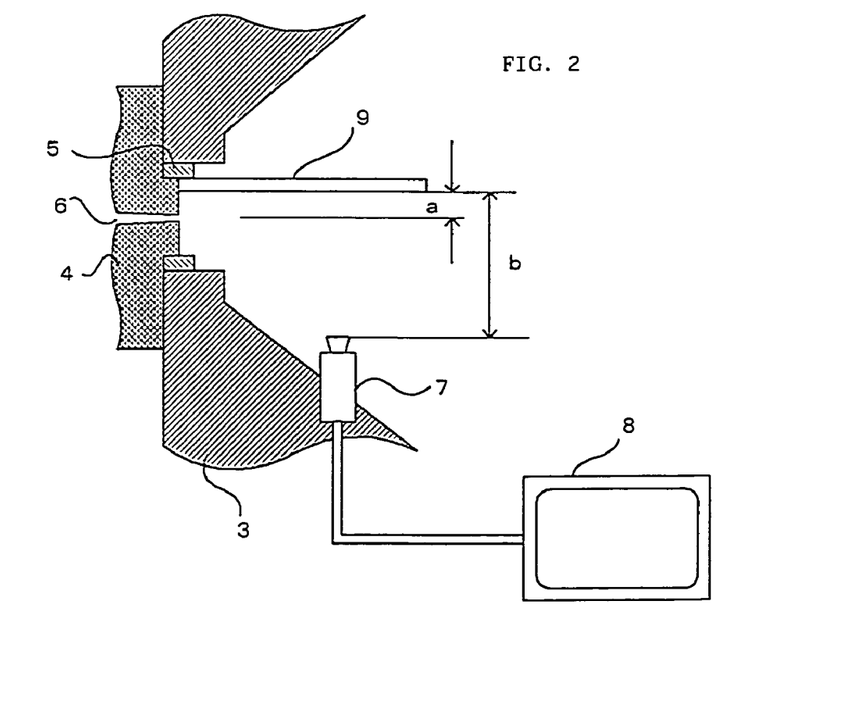
FIG. 2 illustrates how the position of the central axis of the sprue hole is measured according to the second embodiment of the present invention.

If the position of the central axis of the sprue hole 6 is not known, it must be detected. In this case, as shown in FIG. 2, a bar-like or plate-like jig 9 is attached at a known distance "a" from the central axis of the sprue hole 6 and used as a measurement reference point. By measuring the distance "b" from the distance measuring unit 7 to the jig 9, the computing and display unit 8 can obtain the distance from the distance measuring unit 7 to the central axis of the sprue hole 6 by calculating (b−a). Instead of the jig 9, a convex member (not shown) may be provided in a position at a known distance from the central axis of the sprue hole 6; the distance from the distance measuring unit 7 to the central axis of the sprue hole 6 can also be obtained similarly by measuring the distance from the distance measuring unit 7 to the convex member. The reference point for the distance measurement can be located on the mold, a part accompanying the mold, a jig attached to the mold, the platen securing the mold in the injection molding machine, a jig attached to the platen, or other parts if their distances to the central axis of the sprue hole 6 have been measured in advance and are known.

Figure 3:
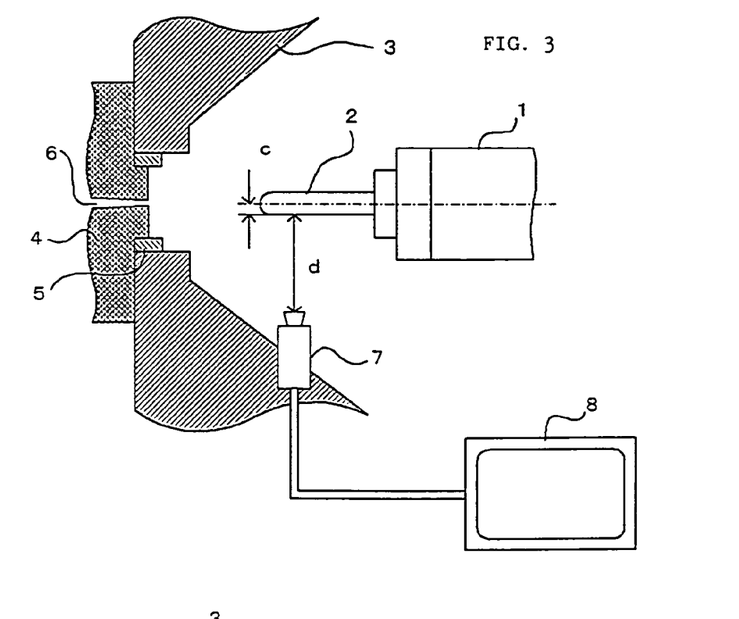
FIG. 3 illustrates how the position of the central axis of the nozzle hole is measured according to the second embodiment of the present invention.

After the distance from the distance measuring unit 7 to the central axis of the sprue hole 6 has been obtained, the injection unit is brought close to the mold and positioned so that the injection nozzle 2 is near the sprue bushing 4 and the distance to the side of the injection nozzle can be measured by the distance measuring unit 7 as shown in FIG. 3. As described above, the distance "d" from the distance measuring unit 7 to the side of the injection nozzle 2 is measured. Since the distance "c" from the central axis of the nozzle hole to the outer surface of the injection nozzle 2 is known, the computing and display unit 8 calculates (c+d) by using the measured distance "d" from the distance measuring unit 7 to the outer surface of the injection nozzle 2, and obtains the distance from the distance measuring unit 7 to the central axis of the nozzle hole in the injection nozzle 2.

From the distance (b−a) from the distance measuring unit 7 to the central axis of the sprue hole 6 and the distance (c+d) from the distance measuring unit 7 to the central axis of the nozzle hole in the injection nozzle 2, obtained as described above, the computing and display unit 8 obtains the displacement between the central axis of the sprue hole 6 and the central axis of the nozzle hole in the injection hole 2 by calculating $\{(b-a)-(c+d)\}$, and displays the result on the screen.

Accordingly, the displacement between the central axis of the sprue hole 6 and the central axis of the nozzle hole in the injection nozzle 2 can be obtained by measurements made by means of the distance measuring unit 7 as described above, regardless of whether the position of the sprue hole is known or unknown.

It is necessary to obtain the displacement between the central axis of the sprue hole 6 and the central axis of the nozzle hole in the injection nozzle 2 as a displacement in a two-dimensional plane. By measuring the displacement between the central axis of the sprue hole 6 and the central axis of the nozzle hole in the injection nozzle hole 2 by the method indicated in FIG. 1 or FIGS. 2 and 3 in at least two directions that are not parallel or collinear, the two-dimensional displacement between the two central axes can be calculated.

Figure 4:
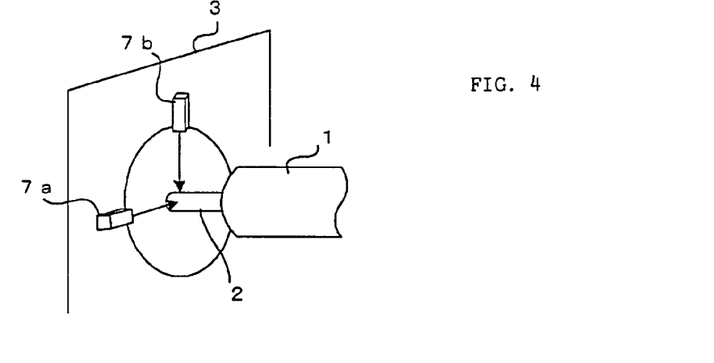
FIG. 4 illustrates how positional displacement between the central axis of the sprue hole and the central axis of the nozzle hole is measured in a plane by using two distance measuring units in the above embodiments.
Figure 5:
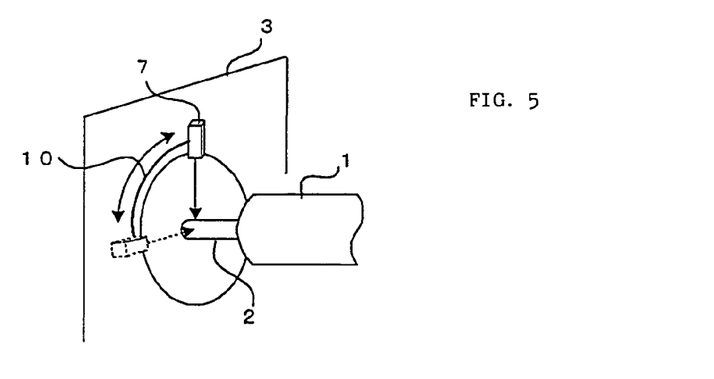
FIG. 5 illustrates how positional displacement between the central axis of the sprue hole and the central axis of the nozzle hole is measured in a plane by using a single distance measuring unit in the above embodiments.

In FIG. 4, two distance measuring units 7a, 7b are used to measure the distance to the outer surface of the injection nozzle 2 from different directions; the displacement between the central axis of the sprue hole 6 and the central axis of the nozzle hole in the injection nozzle 2 is obtained in each direction in order to obtain the displacement between the two axes in a two-dimensional plane. In FIG. 5, a single distance measuring unit 7 is moved in a plane to measure the distance to the outer surface of the injection nozzle 2 from different directions in order to obtain the displacement between the central axis of the sprue hole 6 and the central axis of the nozzle hole in the injection nozzle 2. In FIG. 5, reference numeral 10 denotes a motion guiding member that guides movement of the distance measuring unit 7; the motion guiding member may be attached to the stationary platen 3. After the displacement between the central axis of the sprue hole 6 and the central axis of the nozzle hole in the injection nozzle 2 has been obtained at a first measurement point by the measurement method illustrated in FIG. 1 or FIGS. 2 and 3, another displacement is obtained similarly by shifting to a second measurement position, thereby obtaining the displacement in a two-dimensional plane.

The computing and display unit 8 (the controller of the injection molding machine) calculates the values measured in the different directions to obtain the displacement, and displays it on the display unit; the operator adjusts the position of the central axis of the nozzle hole so that the displayed displacement becomes zero so as to align the injection nozzle 2 to the sprue hole 6.

Figure 6:
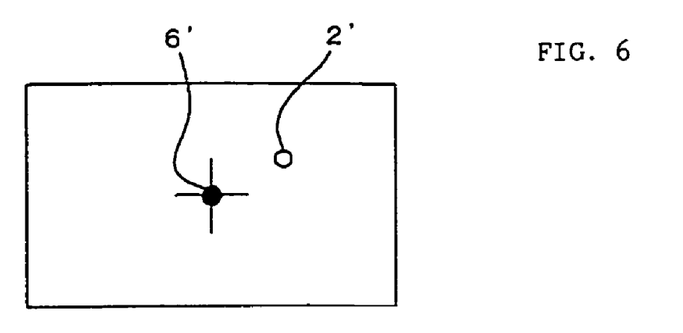
FIG. 6 is an exemplary screen display showing the central axis position of the sprue hole and the central axis position of the nozzle hole.

Alternatively, as shown in FIG. 6, the central axis position 6' of the sprue hole and the central axis position 2' of the nozzle hole may be displayed on the computing and display unit 8 so that their positional relationship is indicated; the operator can then align the central axis of the sprue hole and the central axis of the nozzle hole by adjusting the position of the injection nozzle 2 until the two positions displayed on the computing and display unit 8 coincide.

In the example shown in FIGS. 4 and 5, the two measurement directions are orthogonal to each other, but they do not always need to be orthogonal; measurement is possible in any two directions that are not collinear. Measurement direction needs not be orthogonal to the central axis of the sprue hole 6 or the central axis of the nozzle hole in the injection nozzle 2 if the angle formed by each measurement direction and a plane orthogonal to the central axis of the sprue hole 6 or the nozzle hole in the injection nozzle 2 is known; with the actually measured distance from the distance measuring unit 7 to the side of the injection nozzle 2 or to the jig 9 and the known measurement angle, corresponding distance projected on a plane which is orthogonal to the central axis of the sprue hole 6 or the central axis of the nozzle hole in the injection nozzle 2 is obtained, with the result that the distance from the distance measuring unit 7 to the side of the injection nozzle 2 or to the jig 9 can be obtained.

The first and second measurement points to which the distance measuring unit 7 is guided by the movement guide member 10 shown in FIG. 5 need not always be positioned on the same arc. If the distance measuring unit 7 is disposed at a distance B from the outer circumference of the locating ring 5 and a distance D from the side of the injection nozzle 2, for example, the displacement can be obtained by calculating $\{(A+B)-(C+D)\}$, as described above. If the distance measuring unit 7 is disposed $\Delta x$ lower than indicated in FIG. 1 in the measurement direction, the amount of displacement is obtained from the equation $\{(A+\Delta x+B)-(C+D+\Delta x)\}=\{(A+B)-(C+D)\}$; this means that displacement of the distance measuring unit 7 in the measurement direction does not affect obtaining of the displacement between the central axis of the sprue hole 6 and the central axis of the nozzle hole in the injection nozzle 2, so the displacement of the distance measuring unit 7 in the measurement direction in the first and second measurements does not affect the distance measurement at all.

After obtaining the displacement between the central axis of the sprue hole 6 and the central axis of the nozzle hole in the injection nozzle 2, as described above, the position of the injection nozzle 2 is adjusted by adjustment means, such as manual adjustment means comprising adjusting bolts, so that the displacement becomes zero. By operating such adjusting bolts manually, the injection unit to which the injection nozzle 2 and the injection cylinder are attached is caused to move horizontal y and vertically so that the displacement is eliminated.

Figure 7:
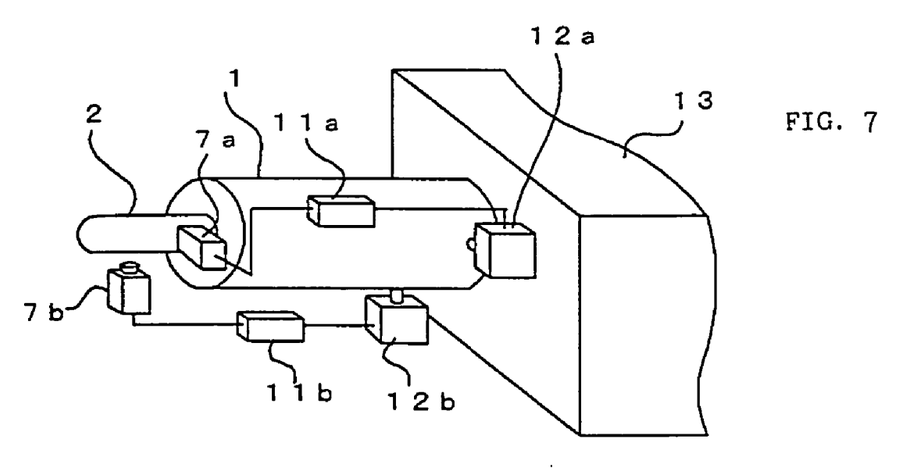
FIG. 7 shows a position adjustment mechanism that automatically adjusts the displacement between the central axis of the sprue hole and the central axis of the nozzle hole and aligns the central axes.

Instead of position adjustment by the operator, the structure shown in FIG. 7 can be used for automatic alignment between the central axis of the sprue hole 6 and the central axis of the nozzle hole in the injection nozzle 2. In the example shown in FIG. 7, two distance measuring units 7a, 7b are used to measure the distances to the sides of the injection nozzle 2 in two mutually orthogonal axial directions, such as the X-axis and Y-axis directions; air cylinders 12a, 12b are disposed to drive the injection unit 13 in these two directions, the X-axis and Y-axis directions. The output from distance measuring unit 7a, which measures the position of the side of the injection nozzle in the X-axis direction, is sent through an output unit 11a to the air cylinder 12a that drives the injection unit 13 in the X-axis direction; the output from distance measuring unit 7b, which measures the position of the side of the injection nozzle in the Y-axis direction, is sent through an output unit 11b to the air cylinder 12b that drives the injection unit 13 in the Y-axis direction. In this case, the computing and display unit 8, which is configured as the controller of the injection molding machine, delivers a displacement in each direction to a position adjustment mechanism that comprises the distance measuring units 7a, 7b, output units 11a, 11b, and air cylinders 12a, 12b. Specifically, the distances to the outer surfaces of the injection nozzle 2 are measured by the respective distance measuring units 7a, 7b, and, for eliminating the corresponding displacement, feedback control is performed to drive the air cylinders 12a, 12b through the respective output units 11a, 11b. With the feedback control, alignment for eliminating the displacement between the central axis of the sprue hole 6 and the central axis of the nozzle hole in the injection nozzle 2 can be performed automatically. Incidentally, if the paired distance measuring unit 7a and air cylinder 12a are disposed so that the measurement direction of the distance measuring unit coincides with the driving direction of the air cylinder, and the other paired distance measuring unit 7b and air cylinder 12b are disposed in the same way with the two directions of the two pairs being mutually orthogonal, control can be performed easily; if the measurement directions and the driving directions are known, however, control is also possible without matching the measurement direction and the driving direction of each pair and without making the measurement directions of the two distance measuring units 7a, 7b mutually orthogonal, or the driving directions of the air cylinders 12a, 12b mutually orthogonal.

A jack or a linear driving mechanism comprising a ball screw, a motor, and other parts can be used for position adjustment, instead of an air cylinder.

The invention claimed is:

1. An injection molding machine having centering means for centering a nozzle hole in an injection nozzle to a sprue hole, the centering means comprising:
   a distance measuring unit that measures a distance from the distance measuring unit to a first reference point at a known distance from the central axis of the nozzle hole;
   means for obtaining a displacement between the central axis of the nozzle hole and a known central axis of the sprue hole using the distance measured by the distance measuring unit; and
   means for adjusting the position of the injection nozzle using the obtained displacement, wherein the distance measuring unit is a single movable unit associated with a motion guiding member said motion guiding member guiding movement of the single movable distance measuring unit so that the displacement between the central axis of the nozzle hole and the central axis of the sprue hole can be obtained in a plurality of directions by moving the single movable distance measuring unit to different positions.

2. An injection molding machine having centering means for centering a nozzle hole in an injection nozzle to a sprue hole, the centering means comprising:

a distance measuring unit that measures a first distance from the distance measuring unit to a first reference point at a known distance from the central axis of the nozzle hole and a second distance to a second reference point at a known distance from the central axis of the sprue hole;

means for obtaining a displacement between the central axis of the nozzle hole and the central axis of the sprue hole using the first distance and the second distance measured by the distance measuring unit; and means for adjusting the position of the injection nozzle using the obtained displacement, wherein the distance measuring unit is a single movable unit associated with a motion guiding member said motion guiding member guiding movement of the single movable distance measuring unit so that the displacement between the central axis of the nozzle hole and the central axis of the sprue hole can be obtained in a plurality of directions by moving the single movable distance measuring unit to different positions.

3. The injection molding machine according to claim 1 or claim 2, wherein the first reference point is set on the outer circumference of the injection nozzle, on the outer circumference of an injection section component that engages the injection nozzle, or on a jig attached to the injection section.

4. The injection molding machine according to claim 2, wherein the second reference point is set on a mold, a part accompanying the mold, a jig attached to the mold, a platen of the injection molding machine that secures the mold, or a jig attached to the platen.

5. The injection molding machine according to claim 1 or claim 2, including a plurality of distance measuring units, the displacement between the central axis of the nozzle hole and the central axis of the sprue hole being obtained in a plurality of directions according to distances measured by the plurality of distance measuring units.

6. The injection molding machine according to claim 1 or claim 2, wherein a single distance measuring unit is provided, the displacement between the central axis of the nozzle hole and the central axis of the sprue hole being obtained in a plurality of directions by moving the distance measuring unit to different positions.

7. The injection molding machine according to claim 1 or claim 2, wherein the distance measuring unit is connected to a computing and display unit, and the displacement is displayed on the computing and display unit.

8. The injection molding machine according to claim 1 or claim 2, wherein centering of the nozzle hole to the sprue hole is carried out by using a manual adjustment means to manually adjust the injection nozzle by the obtained displacement.

9. The injection molding machine according to claim 1 or claim 2, wherein centering of the nozzle hole to the sprue hole is carried out by using a driving means and adjusting the driving means by the obtained displacement.

* * * * *

UNITED STATES PATENT AND TRADEMARK OFFICE
CERTIFICATE OF CORRECTION

| | |
|---|---|
| PATENT NO. | : 7,665,978 B2 |
| APPLICATION NO. | : 11/033728 |
| DATED | : February 23, 2010 |
| INVENTOR(S) | : Satoshi Takatsugi |

It is certified that error appears in the above-identified patent and that said Letters Patent is hereby corrected as shown below:

Column 8, Line 4, change "horizontal y" to --horizontally--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,665,978 B2 Page 1 of 1
APPLICATION NO. : 11/033728
DATED : February 23, 2010
INVENTOR(S) : Satoshi Takatsugi

It is certified that error appears in the above-identified patent and that said Letters Patent is hereby corrected as shown below:

Column 9, Line 2, change "member" to --member,--.

Column 9, Line 25, change "member" to --member,--.

Signed and Sealed this

Twenty-second Day of June, 2010

David J. Kappos
*Director of the United States Patent and Trademark Office*